Nov. 18, 1947.  C. B. MOORE  2,431,297
PNEUMATIC CONTROL APPARATUS
Filed July 17, 1943  2 Sheets-Sheet 1
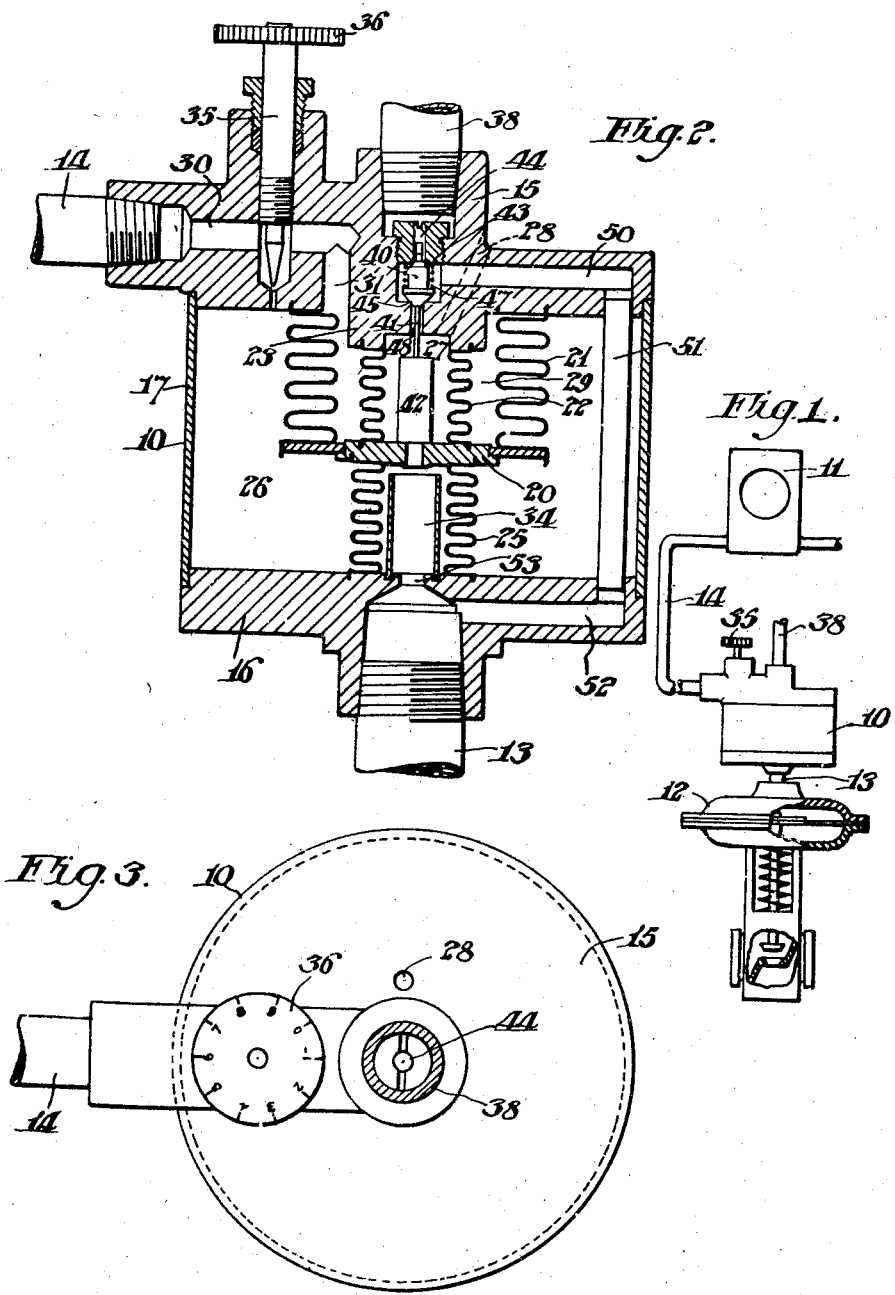
Inventor
Coleman B. Moore
By J. T. Wobensmith
Attorney.

Nov. 18, 1947.    C. B. MOORE    2,431,297
PNEUMATIC CONTROL APPARATUS
Filed July 17, 1943    2 Sheets-Sheet 2
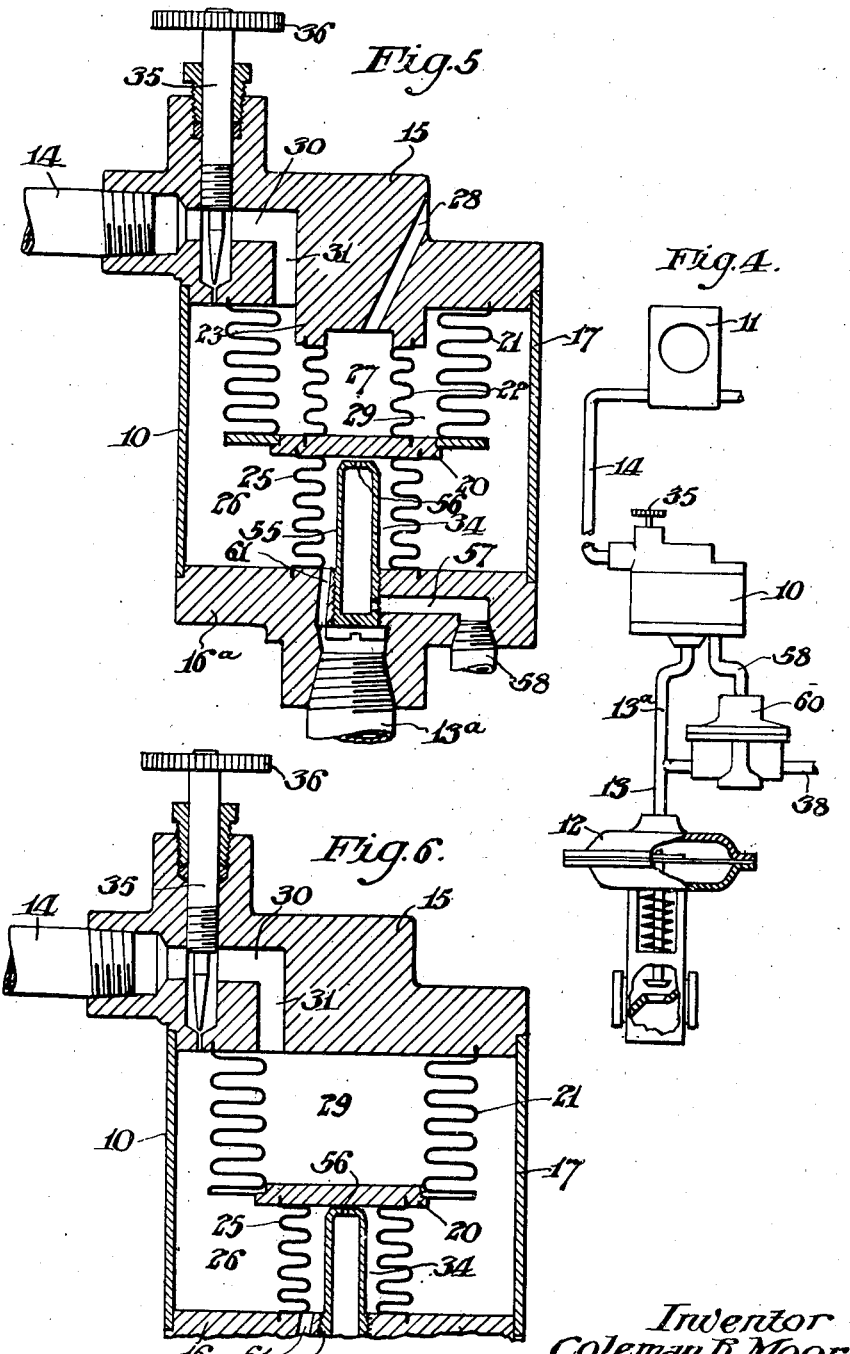
Inventor
Coleman B. Moore.
By Z. T. Wolbensmith
Attorney.

Patented Nov. 18, 1947

2,431,297

UNITED STATES PATENT OFFICE 2,431,297

PNEUMATIC CONTROL APPARATUS

Coleman B. Moore, Carroll Park, Pa., assignor to Moore Products Co., Philadelphia, Pa., a copartnership Application July 17, 1943, Serial No. 495,183

9 Claims. (Cl. 137—153)

This invention relates to pneumatic control apparatus and more particularly to apparatus which is responsive to the rate of application of fluid pressure applied thereto for applying a corrective factor for use in the control of other apparatus.

In pneumatic control apparatus now available provisions have been made for adjustment of the sensitivity or the throttling range or control band, and for reset or preventing shifting of the control point with load changes. Such apparatus is not entirely satisfactory for the control of processes which involve long time lags and large capacities, with frequent and sudden load changes of either large or small magnitude or both. The conventional type of apparatus heretofore employed in attempts to overcome these shortcomings utilized a volume and a needle valve to delay the pressure to the throttling bellows and thereby effect the application of an additive corrective force until sufficient time had elapsed for a return to normal. With such apparatus any adjustment of the time delay needle valve resulted in changes in both the time and the magnitude of the corrective force and did not provide adequate speed for the desired input. The correction to provide the desired input accordingly required the sacrifice of either speed or magnitude.

In accordance with the present invention the magnitude of the corrective force is constant for a given change in the measured variable and the time only is varied as desired. The changes in the time are effected by changes in needle valve setting. Accordingly with the apparatus of the present invention a greater correction may be applied and the correction removed in a shorter time thereby providing a more stable control characteristic for a particular process. The apparatus of the present invention is not limited in its capabilities but may be used with pneumatic control systems having adjustable throttling ranges, with systems having either manual or automatic reset, or with systems having both an adjustable throttling range and reset.

It is the principal object of the present invention to provide improved pneumatic control apparatus in which a correction is applied to a control pressure in accordance with the rate of change of the control pressure.

It is a further object of the present invention to provide a rate response unit in which the magnitude of the applied pressure is substantially constant for predetermined conditions and in which the time of application may be varied as desired.

It is a further object of the present invention to provide a rate response unit which may be employed with existing installations for the purpose of improving the characteristics thereof.

It is a further object of the present invention to provide a rate response unit utilizing a separate source of power for imposing a corrective effect.

Other objects of the invention will be apparent from the annexed specification and claims.

The nature and characteristic features of the invention will be more readily understood from the following description, taken in connection with the accompanying drawings forming part hereof, in which:

Figure 1 is a diagrammatic view of pneumatic control apparatus embodying a rate response unit in accordance with the present invention;

Fig. 2 is a vertical central sectional view through one form of rate response unit in accordance with the present invention;

Fig. 3 is a plan view of the unit shown in Fig. 2;

Fig. 4 is a diagrammatic view of pneumatic control apparatus embodying a rate response unit in accordance with the present invention;

Fig. 5 is a vertical central sectional view through another form of rate response unit; and Fig. 6 is a vertical central sectional view through another form of rate response unit in accordance with the present invention.

In the various views like reference characters are used to designate like parts.

It will, of course, be understood that the description and drawings herein are illustrative merely, and that various modifications and changes may be made in the structure disclosed without departing from the spirit of the invention.

Refering more particularly to Figs. 1, 2 and 3 of the drawings, there is illustrated a pneumatic system which includes a rate response unit 10 having a connection for delivering air at a controlled pressure with an additive or subtractive effect superimposed upon an instrument pressure transmitted from a control instrument such as an air controller 11, the controller 11 being connected to the rate response unit 10 by transmission line or pipe 14. The control response setting up the instrument pressure transmitted by the controller 11 can be derived from temperature, pressure, flow, or any other variable change which it is desired to control. The rate response unit 10 is illustrated as connected by a pipe 13 to a diaphragm valve 12, although it could be used for the control of other apparatus. It will of course be obvious that, if desired, the diaphragm valve 12 may operate a four way valve for controlling liquid delivery to and discharge from a power cylinder (not shown) or the like for valve or damper operation.

The rate response unit 10 shown in detail in Figs. 2 and 3 provides an amplifying effect and also a proportionate reduction as hereinafter pointed out.

In the form illustrated in Figs. 2 and 3, a body member 15 is provided. A lower closure 16 is provided, spaced from the body member 15 and connected thereto by a cylindrical wall 17 which is secured at its ends respectively to the body member 15 and to the lower closure 16 in fluid tight relationship.

In the space between the body member 15 and the closure 16 a bellows closure plate 20 is provided. The bellows closure plate 20 has a flexible metallic bellows 21 secured thereto, the opposite end of the bellows 21 being secured to the body member 15 in fluid tight relationship. Within the bellows 21 a flexible metallic bellows 22 is provided which is also secured to the bellows closure plate 20 and to a boss 23 formed on the body member 15. A flexible metallic bellows 25 is provided and is secured at its ends to the bellows closure plate 20 and to the closure member 16 in fluid tight relationship. A fluid pressure chamber 26 is thus provided in the enclosed space outside the bellows 21 and the bellows 25 and within the cylindrical wall 17. A chamber 27 is also provided within the interior of the bellows 22 and this chamber 27 is in communication with the atmosphere through a port 28. A pressure chamber 34 is provided in the interior of the bellows 25. A fluid pressure space 29 is also provided in the space between the bellows 21 and the bellows 22. The bellows 22 is preferably made slightly smaller than the bellows 25 for purposes hereinafter more fully explained.

Passageways 30 and 31 are provided and a needle valve 35 is mounted in the body member 15 for permitting a regulated bleeding of the fluid from the chamber 29 to the chamber 26, or from the chamber 26 to the chamber 29, the rate of bleed being determined in accordance with the setting of the needle valve 35 as hereinafter pointed out. The needle valve actuator or handle 36 may have suitable graduations thereon to indicate the setting thereof. The passageway 30 has the conduit 14 connected thereto for the delivery of the controlled instrument pressure from the air controller 11 or other desired source of control pressure.

A supply connection 38 is provided for supplying fluid under pressure, preferably from a separate filtered and pressure regulated air supply, and a pilot valve 40 is mounted in the body member 15. The pilot valve 40 is controlled by a stem 41 which is actuated by an extension rod 42 which is connected to and movable with the bellows closure plate 20.

An upper and adjustable valve seat 43 is provided, having an opening 44 therethrough for admission of air from the supply connection 38, and a lower and fixed valve seat 45 is provided at the opposite end of a pilot valve chamber 47. The fixed valve seat 45 has an opening 46 for permitting the flow of fluid from the pilot valve chamber 47 into the pressure chamber 27 and therefrom to the atmosphere, in accordance with the positioning of the pilot valve 40. The pilot valve 40 is adapted to be positioned between the upper valve seat 43 and the lower valve seat 44 so that the pressure prevailing at the pilot valve chamber 47 is determined by the positioning of the pilot valve 40. When the pilot valve 40 is in its uppermost position, in engagement with the upper valve seat 43 the supply of fluid from the supply connection 38 is cut off while at the same time fluid is permitted to discharge past the lower valve seat 45. When the pilot valve 40 is in its lowermost position, discharge of the fluid past the lower valve seat 45 will be cut off and the maximum supplying of fluid past the upper valve seat 43 will be effected. The pilot valve 40 will normally be positioned between the upper seat 43 and lower seat 45 as hereinafter pointed out. The pilot valve chamber 47 is connected by a passageway 50, a pipe 51 and a passageway 52 to the connection 13 through which pressure is adapted to be transmitted for effecting the desired operations. The conduit 13 through which the pressure is transmitted is also in communication through an opening 53 with the chamber 34 in the interior of the bellows 25.

Referring to Figs. 1, 2 and 3 it will be noted that upon an increase in the instrument pressure supplied through the connection 14 from the air controller 11, this increase in pressure is effective in the chamber 29 and the bellows 21 and the bellows 22 are expanded and bellows 25 is compressed. This causes a downward movement of the plate 20 and an actuation of the pilot valve 40 through the extension rod 42 to move the pilot valve 40 further away from the upper seat 43 and closer to or against the lower valve seat 45. This positioning of the pilot valve 40 effects an increase in the pressure in the pilot valve chamber 47 which is transmitted through the passageway 50, the pipe 51, the passageway 52 to the pressure transmitting connection 13. The pressure increase in the bellows 25 is effective in the chamber 34 and the increase in the pressure transmitted through the pipe 13 is effective on the diaphragm of the diaphragm operated valve 12 for actuation thereof. The increased pressure within the chamber 29 will equalize by flowing past the needle valve 35 into the chamber 26. After equalization of the pressure in the chamber 29 and the chamber 26 the pressure in the chamber 34 will be at a value which will hold the system in equilibrium.

The effective area of the bellows 21 may be taken as A, the effective area of the bellows 22 may be taken as B, the effective area of the bellows 25 may be taken as C, the instrument pressure may be taken as $p$ and the transmitted pressure may be taken as $p_t$. It will be noted that since, area A minus area B, is greater than, area A minus area C, therefore the final pressure on area C in the chamber 34 will be slightly greater at the new equilibrium conditions after equalization of the pressures in the chambers 26 and 29 and in the same direction as the instrument pressure.

If the instrument pressure supplied from the controller 11 decreases, the decrease in pressure is first effective in the chamber 29 causing the pilot valve 40 to be positioned to reduce the supply of air from the supply connection 38 past the seat 43 and increase the discharge past the seat 45. This causes a decrease of the pressure in the passageway 50, the pipe 51 and the passageway 52, in the chamber 34 in the bellows 25 and at the pressure transmission connection 13. The decreased pressure within the chamber 29 will equalize by a flow past the needle valve 35 from the chamber 26. The bellows plate 20 is thus poresults in the desired linear characteristics of the transmitted pressure in its relationship with respect to the variable condition.

It will be noted that if the rate of change of the instrument pressure supplied to the rate response unit 10 is slow, that is, the pressure increases or decreases slowly, the transmitted pressure delivered to the pipe 13 will also change slowly and in the same direction and, if infinitely slow, without the application of the temporary overcorrection.

Upon a rapid change of the value of the instrument pressure supplied to the rate response unit 10, a corrective pressure will be applied to or superimposed on the transmitted pressure, the rate of change of the instrument pressure determining the total amount of overcorrection which is the area under the pressure-time curve. The time for equalization or the time required to attain new equilibrium conditions is determined by the setting of the needle valve 35 which is adjusted in accordance with the requirements of the particular process to be controlled. Consequently for a given setting of the needle valve 35 between the limits of open and closed an increase in instrument pressure at a slow rate will have a negligible amplifying effect on the transmitted pressure while a higher speed instrument pressure change will have a greater temporary amplifying effect which is finally equalized in the bellows chamber 34 when the instrument pressure is equalized across the needle valve 35.

I claim:

1. In pneumatic control apparatus, a rate response unit comprising a casing having a chamber therein, an expansible chamber within said first chamber bounded in part by a movable closure member, means for applying a variable pressure within said first expansible chamber, a second smaller expansible chamber within said first chamber bounded in part by said movable member and on the opposite side thereof from said first expansible chamber, adjustable means for controlling the flow between said first chamber and said first expansible chamber for controlled equalization of the pressure in said chambers, and means controlled by the positioning of said movable member for transmitting a control pressure and applying said control pressure within said second expansible chamber for rebalancing said movable member.

2. In pneumatic control apparatus, a rate response unit comprising a casing having a chamber therein, an expansible chamber within said first chamber bounded in part by a movable closure member, means for applying a variable pressure within said first expansible chamber, a second smaller expansible chamber within said first chamber bounded in part by said movable member and on the opposite side thereof from said first expansible chamber, adjustable means for controlling the flow between said first chamber and said first expansible chamber for controlled equalization of the pressure in said chambers, a separate source of regulated pressure, and means controlled by the positioning of said movable member for transmitting a control pressure from said source.

3. In pneumatic control apparatus, a rate response unit comprising a casing having a chamber therein, an expansible chamber within said first chamber bounded in part by a movable closure member, means for applying a variable pressure within said first expansible chamber, a second smaller expansible chamber within said first chamber bounded in part by said movable member and on the opposite side thereof from said first expansible chamber, adjustable means for controlling the flow between said first chamber and said first expansible chamber for controlled equalization of the pressure in said chambers, a source of regulated pressure, and means controlled by the positioning of said movable member for transmitting a control pressure from said source and applying said control pressure within said second expansible chamber for rebalancing said movable member to its initial position.

4. In pneumatic control apparatus, a rate response unit comprising a casing having a chamber therein, an expansible chamber within said first chamber bounded in part by a movable closure member, means for applying a variable pressure within said first expansible chamber, a second smaller expansible chamber within said first chamber bounded in part by said movable member and on the opposite side thereof from said first expansible chamber, means for controlling the flow between said first chamber and said first expansible chamber for controlled equalization of the pressure in said chambers, a source of regulated pressure, and means controlled by the positioning of said movable member for transmitting from said source a control pressure having superposed thereon a corrective pressure effect of a magnitude different from that of the variable pressure.

5. In pneumatic control apparatus, a rate response unit comprising a casing having a chamber therein, an expansible chamber within said first chamber bounded in part by a movable closure member, means for applying a variable pressure within said first expansible chamber, a second smaller expansible chamber within said first chamber bounded in part by said movable member and on the opposite side thereof from said first expansible chamber, means for controlling the flow between said first chamber and said first expansible chamber for controlled equalization of the pressure in said chambers, a source of regulated pressure, and means controlled by the positioning of said movable member for transmitting from said source a control pressure having superposed thereon a corrective pressure effect of a magnitude different from that of the variable pressure and in the same direction and for applying said control pressure within said second expansible chamber for rebalancing said movable member.

6. In pneumatic control apparatus, a corrective unit having a movable portion with opposed faces, means for applying on one of said faces a pressure from a variable source, a source of pressure regulated fluid, pressure transmitting means actuated by the positioning of said movable portion for transmitting from said second mentioned source a control pressure comprising the algebraic sum of an effect of the magnitude of departure from a predetermined value of the pressure from the variable source and an effect of the rate of departure of the pressure from the variable source, said transmitting means including a fixedly mounted nozzle having a discharge orifice controlled by the positioning with respect thereto of the other of said faces.

7. In pneumatic control apparatus, a corrective unit having a movable portion with opposed faces, means for applying on one of said faces a pressure from a variable source, a source of pressure regulated fluid, pressure transmitting means actuated by the positioning of said movable porsitioned after equalization in the same direction as that required by the change of the instrument pressure and the pressure in the chamber 34 will be at a value which will hold the system in equilibrium.

The system, including the bellows closure plate 20, is in equilibrium when the total forces acting upwardly on the plate 20 are exactly equal to the total forces acting downwardly on the plate 20 or, using the values assigned above, $$p(A-C) + p_t C = p(A-B)$$

It follows that, after equalization through the needle valve 35, the bellows closure plate 20 will be in equilibrium even if the instrument pressure is at either a higher or lower level than initially and the pressure in the chamber 34 on the area C will have a different value than before for balancing at equilibrium.

With the needle valve 35 closed the direct measure of the amplification is $$\frac{A-B}{C}$$

With the needle valve 35 wide open to allow the pressure to equalize the ratio of reduction at equilibrium is $$\frac{C-B}{C}$$

In so far as pressure changes in the bellows 25 and on the area C are concerned the overall amplification is the amplification with the needle valve 35 closed divided by the reduction with the needle valve 35 open.

Upon an instantaneous change in instrument pressure the maximum amplification is reached which equalizes to the greatest reduction when the pressure equalizes across the needle valve 35. The setting of the needle valve 35 determines the time element before equilibrium is reached.

With an infinitely slow change in instrument pressure there is a corresponding change in the pressure in the bellows chamber 34 at the greatest reduction. The setting of the needle valve is negligible in its effect.

With intermediate speeds there will be a tendency to reach the maximum amplification value but the setting of the needle valve 35, since it influences the time element, will be a factor in the attaining of equilibrium conditions.

It will be noted that any change in the instrument pressure through the conduit 14 is effective in the chamber 29 to cause an immediate application of a corrective effect and that upon equalization of pressure in the chambers 26 and 29 in accordance with the time determined by the setting of the needle valve 35 the corrective effect is removed, except for the small change effective in the pressure in the chamber 34 after equilibrium has been reached. The application of the corrective effect is affected by the time element as determined by the setting of the needle valve 35 and is directly responsive to the rate of change of instrument pressure in either direction.

In the form of the invention illustrated in Figs. 4 and 5 the same characteristics are present as in the form shown in Figs. 2 and 3. The pilot valve 40 and its connections are eliminated.

The control system shown in Fig. 4 includes an air controller 11 or other source of instrument pressure delivered to a rate response unit 10 for controlling a diaphragm valve 12. A detector nozzle and pressure transmitter or booster pilot are employed, preferably substantially the same as shown in my prior application for Letters Patent for Pneumatic transmission systems, filed July 29, 1942, Serial No. 452,760, now Patent No. 2,359,236, granted September 26, 1944.

The detector nozzle shown at 55 is mounted in the closure 16 and has an orifice 56 spaced at a predetermined distance from the lower face of the closure 20 so that the location of the closure plate 20 determines the discharge through the orifice 56. The interior of the nozzle 55 is connected by a passageway 57 in the closure 16 and a pipe 58 to a booster pilot 60. The booster pilot 60 has a separate filtered and pressure regulated supply of air 38. The booster pilot 60 is also connected to the interior of the bellows 25 through a passageway 61 and a pipe 13$^a$ which is also connected to the pipe 13 for transmission of pressure to the diaphragm valve 12. The booster pilot 60 is very rapid in its operation and is adapted to maintain a constant differential across the orifice 56.

Upon an increase in the instrument pressure this increase is effective in the chamber 29 and causes a downward movement of the plate 20, as heretofore pointed out, thereby tending to decrease the discharge through the orifice 56 of the detector nozzle 55. This decrease in discharge causes an increased pressure to be effective in the booster pilot 60 which responds by supplying fluid at increased pressure which is effective through the pipe 13$^a$ and in the pipe 13. The increased pressure within the chamber 29 will equalize as before by flowing past the needle valve 35 into the chamber 26 and equilibrium conditions will be attained as heretofore pointed out.

Upon a decrease in the instrument pressure the plate 20 initially moves further away from the detector nozzle 55 thereby permitting increased discharge past the orifice 56. This in turn causes a decrease of the pressure transmitted by the booster pilot 60 and effective in the line 13 and the chamber 34, as before.

The rate response unit illustrated in Fig. 6 may also be used in the system shown in Fig. 4 and provides a one to one transmission ratio upon reaching equilibrium. The structure of Fig. 6 is substantially the same as that illustrated in Fig. 5 except that the bellows 22 and the connection from the interior thereof to the atmosphere are eliminated.

The detector nozzle 55 and the booster pilot 60 and their connections are the same as those heretofore pointed out with respect to Fig. 5.

Upon an increase in the instrument pressure supplied from the controller 11 this increase in pressure is effective in the chamber 29 within the bellows 21. The bellows 21 is expanded and the bellows 25 is compressed, thereby causing a downward movement of the plate 20, as heretofore pointed out. This tends to decrease the discharge through the orifice 56 of the detector nozzle 55 which in turn causes the booster pilot 60 to increase the transmitted pressure supplied through the pipe 13. The equalization of pressure in the chambers 29 and 26 through the needle valve 35 occurs as before thereby causing a repositioning or rebalancing of the bellows plate 20 to its initial position with transmission of pressure through the pipe 13 conforming to the instrument pressure.

In the various forms of unit illustrated the repositioning or rebalancing of the closure plate 20 to its initial position upon the resumption of normal transmission conditions free from change in the rate at various levels of instrument pressure tion for transmitting from said second mentioned source a control pressure comprising the algebraic sum of an effect of the magnitude of departure from a predetermined value of the pressure from the variable source and an adjustable effect of the rate of departure of the pressure from the variable source, means for applying said control pressure on the other of said faces for rebalancing said movable portion to its initial position, said transmitting means including a fixedly mounted nozzle having a discharge orifice controlled by the positioning with respect thereto of said other of said faces.

8. In pneumatic control apparatus, a corrective unit comprising an expansible chamber bounded in part by a movable member, means for directly applying a variable pressure within said chamber, a second expansible chamber bounded in part by said movable member, means for applying said variable pressure through a variable restriction in said second chamber in opposition to the pressure in said first chamber, pressure transmitting means for transmitting a control pressure, and means for applying said control pressure on said movable member in opposition to the pressure effective in said first chamber for rebalancing said movable member to its initial position, said last means including a third chamber bounded in part by said movable member.

9. In pneumatic control apparatus, a corrective unit comprising an expansible chamber bounded in part by a movable member, means for directly applying a variable pressure within said chamber, a second expansible chamber bounded in part by said movable member, means for applying said variable pressure through a variable restriction in said second chamber in opposition to the pressure in said first chamber, pressure transmitting means actuated by the positioning of said movable member for transmitting a control pressure, and means for applying said control pressure on said movable member in opposition to the pressure effective in said first chamber for rebalancing said movable member to its initial position, said last means including a third chamber bounded in part by said movable member.

COLEMAN B. MOORE.

REFERENCES CITED

The following references are of record in the file of this patent:

UNITED STATES PATENTS

| Number | Name | Date |
|---|---|---|
| 1,711,066 | Smoot | Apr. 30, 1929 |
| 2,117,800 | Harrison | May 17, 1938 |
| 1,674,456 | Smoot | June 19, 1928 |
| 2,098,914 | Gorrie | Nov. 9, 1937 |
| 2,232,219 | Dueringer | Feb. 18, 1941 |
| 2,073,838 | Hammond | Mar. 16, 1937 |
| 2,409,871 | Krogh | Oct. 22, 1946 |
| 2,360,889 | Philbrick | Oct. 24, 1944 |